(12) United States Patent
Twedt

(10) Patent No.: US 12,084,602 B1
(45) Date of Patent: Sep. 10, 2024

(54) EASY TEAR ADHESIVE TAPE

(71) Applicant: Donald Twedt, Lake Elmo, MN (US)

(72) Inventor: Donald Twedt, Lake Elmo, MN (US)

( * ) Notice: Subject to any disclaimer, the term of this patent is extended or adjusted under 35 U.S.C. 154(b) by 224 days.

(21) Appl. No.: 17/525,310

(22) Filed: Nov. 12, 2021

(51) Int. Cl.
*C09J 7/24* (2018.01)
*B65H 16/02* (2006.01)
*C09J 7/21* (2018.01)
*C09J 7/25* (2018.01)
*C09J 7/38* (2018.01)

(52) U.S. Cl.
CPC ............ *C09J 7/243* (2018.01); *B65H 16/021* (2013.01); *C09J 7/21* (2018.01); *C09J 7/255* (2018.01); *C09J 7/385* (2018.01); *C09J 2301/18* (2020.08)

(58) Field of Classification Search
USPC ......................................................... 206/411
See application file for complete search history.

(56) References Cited

U.S. PATENT DOCUMENTS

| | | | |
|---|---|---|---|
| 3,085,024 A | 4/1963 | Blackford | |
| 4,647,485 A | 3/1987 | Nelson | |
| 5,135,790 A | 8/1992 | Kaplan et al. | |
| 7,138,169 B2 | 11/2006 | Shiota et al. | |
| 8,951,381 B2* | 2/2015 | Maus ................ | B65H 35/0013 |
| | | | 156/577 |
| 8,986,831 B2 | 3/2015 | Bradshaw et al. | |
| 9,139,344 B2 | 9/2015 | Beard | |
| 9,950,891 B2* | 4/2018 | Mallahan, III ....... | B65H 35/002 |
| 10,287,080 B2 | 5/2019 | Stewart | |
| 10,844,249 B2* | 11/2020 | Liu ............................ | C09J 7/22 |
| 2003/0201314 A1 | 10/2003 | Perenyi et al. | |
| 2005/0178678 A1 | 8/2005 | Pawlenko et al. | |
| 2005/0220377 A1 | 10/2005 | Hanus | |
| 2006/0266464 A1* | 11/2006 | White .................. | B65H 35/004 |
| | | | 156/247 |

* cited by examiner

Primary Examiner — Bryon P Gehman
(74) Attorney, Agent, or Firm — Lund IP, PLLC

(57) ABSTRACT

An adhesive tape includes an elongated substrate with a series of perforations forming a tear line extending along a length of the elongated substrate, an adhesive substantially covering a first surface of the elongated substrate, and a cord attached to the elongated substrate by the adhesive, the cord extending along the length of the elongated substrate adjacent to the series of perforations.

22 Claims, 6 Drawing Sheets

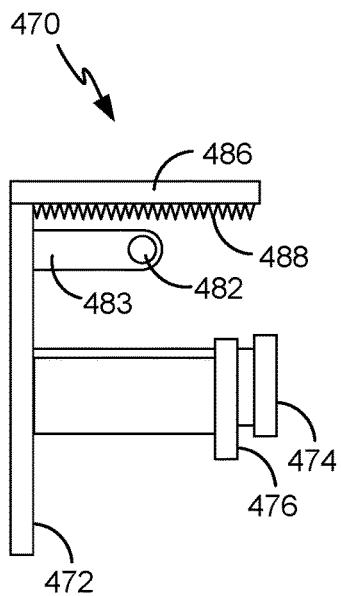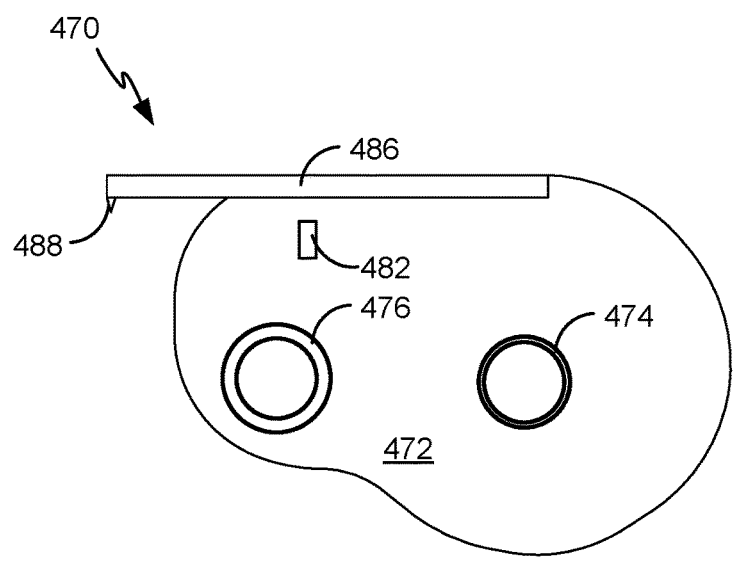
FIG. 4A  FIG. 4B
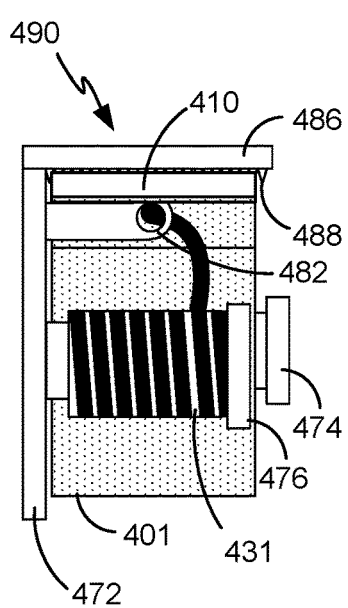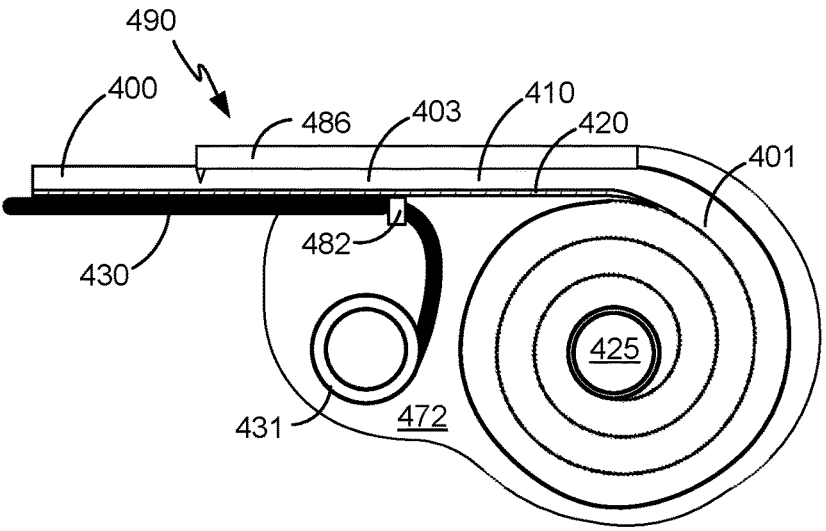
FIG. 4C  FIG. 4D
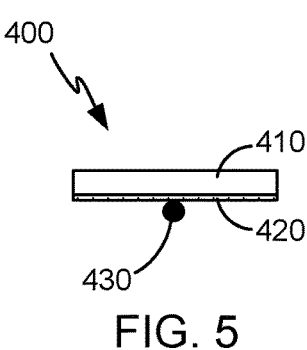
FIG. 5

EASY TEAR ADHESIVE TAPE

TECHNICAL FIELD

This disclosure relates to adhesive tape.

BRIEF SUMMARY

Opening packages can be a frustrating experience. Packages may be difficult to open by hand. In addition, opening a package using cutting tools, such as a knife or scissors, may damage packaging of even the contents of the package. Disclosed herein are techniques for adhesive tape and dispenser that facilitate easy opening of packages without the need for cutting tools.

In one example, an adhesive tape includes an elongated substrate with a series of perforations forming a tear line extending along a length of the elongated substrate, an adhesive substantially covering a first surface of the elongated substrate, and a cord attached to the elongated substrate by the adhesive, the cord extending along the length of the elongated substrate adjacent to the series of perforations.

In another example, a tape dispenser includes a first spool axle configured to receive a roll of adhesive tape, the adhesive tape including an elongated substrate and an adhesive substantially covering a first surface of the elongated substrate, a cutting edge configured to facilitate tearing the adhesive tape after its pulled from the roll of adhesive tape on the first spool axle, a second spool axle configured to receive a spooled cord, a loop configured to orient an end of the cord against a side of the elongated substrate including the adhesive while the adhesive tape is pulled from the roll of adhesive tape on the first spool axle.

In a further example, an assembly includes a roll of adhesive tape, the adhesive tape including an elongated substrate and an adhesive substantially covering a first surface of the elongated substrate, a spool of cord, and a tape dispenser. The tape dispenser includes a first spool axle with the roll of adhesive tape mounted thereon, a cutting edge configured to facilitate tearing the adhesive tape after its pulled from the first spool, a second spool axle with the spool of cord mounted thereon, and a loop configured to orient an end of the cord against a side of the elongated substrate including the adhesive while the adhesive tape is pulled from the roll of adhesive tape on the first spool axle.

BRIEF DESCRIPTION OF THE DRAWINGS

FIGS. 4A-4D illustrate a tape dispenser with spool axles for a roll of adhesive tape and a spool of cord.

FIG. 5 illustrates an adhesive tape formed with the tape dispenser of FIGS. 4A-4D, the adhesive tape including an elongated substrate and a cord extending along the length of the elongated substrate.

DETAILED DESCRIPTION

Figure 1A:
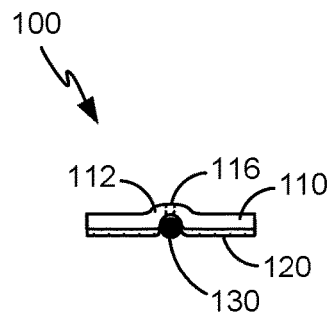
FIGS. 1A-1D illustrate an adhesive tape including an elongated substrate with a series of perforations forming a tear line extending along a length of the elongated substrate and a cord extending along the length of the elongated substrate adjacent to the series of perforations.
Figure 1B:
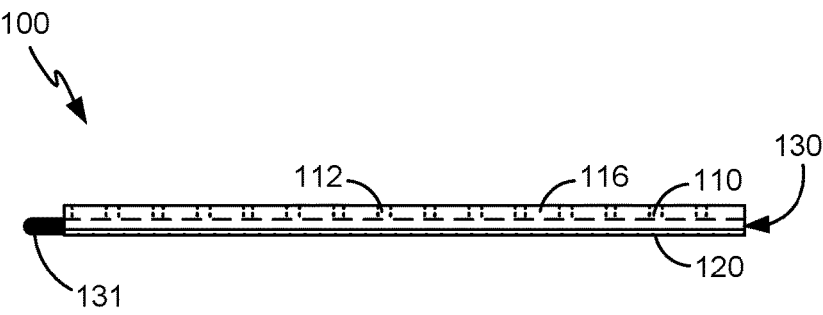
Figure 1C:
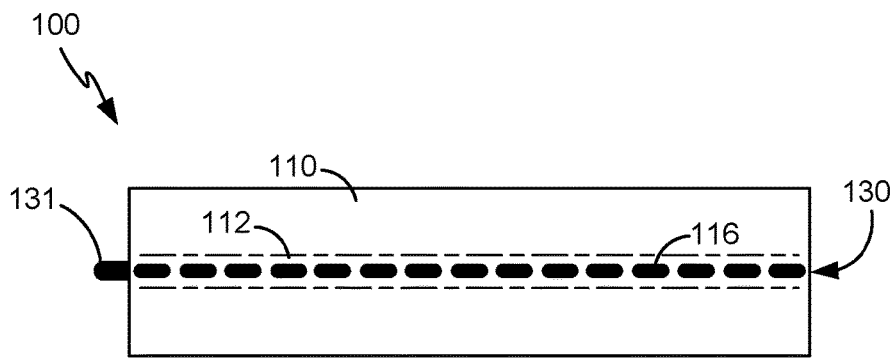
Figure 1D:
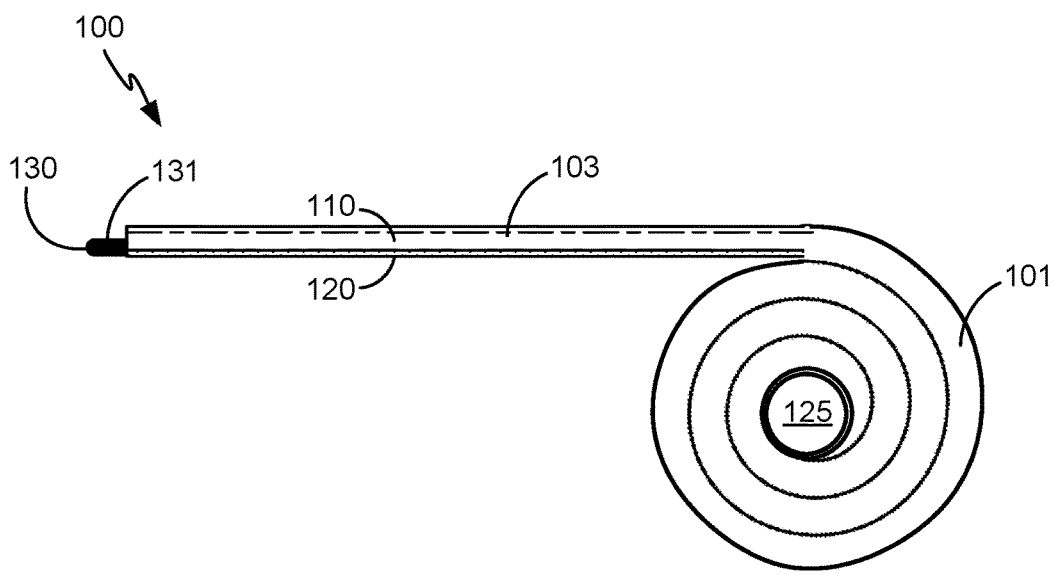

FIGS. 1A-1D illustrate an adhesive tape 100. Specifically, FIG. 1A illustrates a front view, FIG. 1B illustrates a side view, and FIG. 1C illustrates a top view of adhesive tape 100. FIG. 1D illustrates a side view of adhesive tape 100 with an end 103 extending from a wound section 101. The wound section 101 winds around a spool 125.

Adhesive tape 100 includes a generally planar elongated substrate 110 of a generally consistent width and thickness. Elongated substrate 110 includes a series of perforations 116 forming a longitudinal tear line extending along a length of the elongated substrate 110, an adhesive 120 substantially covering a first surface of the elongated substrate 110, and a cord 130 attached to the elongated substrate 110 by the adhesive 120, the cord 130 extending along the length of the elongated substrate 110 adjacent to the series of perforations 116.

The elongated substrate 110 may be any suitable tape substrate and may include one or more of polymer, polyethylene, polyvinyl chloride, polypropylene, polyester, paper, reinforcement strands, fiberglass reinforcement strands, and/or cloth.

The adhesive 120 may be any suitable tape adhesive, such as a pressure sensitive adhesive, and may include one or more of an acrylic adhesive, a viscoelastic polymer, an acrylate polymer, a rubber, a silicone rubber, a thermoplastic elastomer, a tackifier, a resin, an aliphatic resin, an aromatic resin, an aliphatic/aromatic resin, a hydrogenated hydrocarbon resin, terpene-phenol resin, ethylene-vinyl acetate adhesive, novolac adhesive, a rosin, and a terpene rosin.

Cord 130 is an elongated cord with a round transverse cross-section; however, in other examples, cord may have a different shape, such as a flattened transverse cross-section, a polygonal transverse cross-section, or a cross-section including edges and concave sides as shown in FIGS. 7A-7E. In various examples, cord 130 may be a nylon line, a monofilament line, a braided line, a fluorocarbon line, woven fiberglass strand, a metal wire, a natural fiber string, or other line with sufficient tensile strength to tear the elongated substrate 110 when pulled by a user. In one particular example, cord 130 may be a paper or cardboard made from natural fibers. Such an example may improve facilitate recycling of cord 130 in combination with a box adhesive tape 100 is attached to. Cord 130 includes an optional exposed end 131 to facilitate pulling by the user.

In the example of tape 100, the tear line formed by the series of perforations 116 is a longitudinal tear line extending a length of elongated substrate 110. The configuration of the series of perforations 116 is selected to provide suitable strength for securing an object with tape 100 while allowing a user to tear tape 100 along the tear line by pulling cord 130 while the adhesive tape 100 attached to an object, such as a box. For example, the perforations 116 combine to cover more than 25 percent of the length of the elongated substrate, such as at least 50 percent of the length of the elongated substrate 110, or even at least 70 percent of the length of the elongated substrate 110.

In the example of adhesive tape 100, the elongated substrate 110 includes a reduced thickness 112 adjacent to the cord 130, such as a reduced thickness is no greater than 75 percent of a thickness of the elongated substrate 110 in areas not adjacent to the cord 130. The reduced thickness 112 combines with the series of perforations 116 to facilitate tearing the elongated substrate 110 along the tear line by pulling the cord 130 while the adhesive tape 100 attached to an object, such as a box. In other examples, elongated substrate 110 may have a consistent thickness. The reduced thickness 112 may be formed as part of winding adhesive tape on spool 125, which may deform elongated substrate 110 to provide the reduced thickness without impacting the function of a pressure-sensitive adhesive used as adhesive 120.

Figure 2:
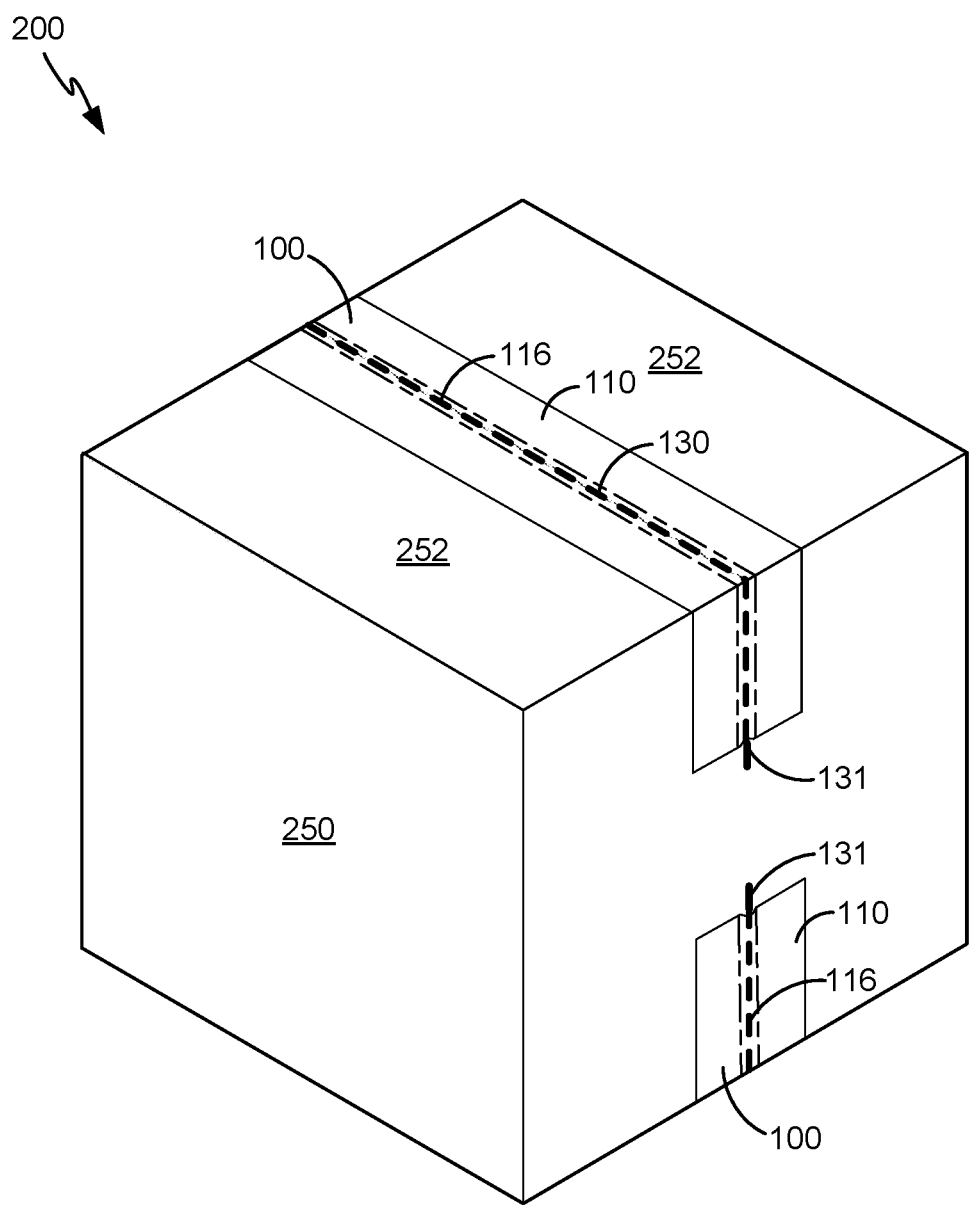
FIG. 2 illustrates the adhesive tape of FIGS. 1A-1D securing flaps of a box in closed positions.

FIG. 2 illustrates an assembly 200 with adhesive tape 100 securing flaps 252 of box 250 in closed positions. Adhesive tape 100 may be used in any manner to secure an object, such as sealing a box, an envelope or other object.

Figure 3A:
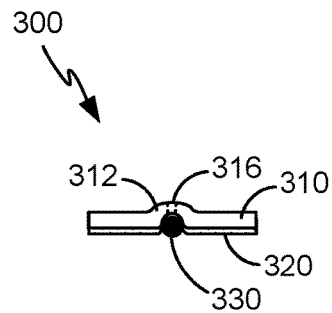
FIGS. 3A-3D illustrate an adhesive tape including an elongated substrate with a series of perforations forming an undulating tear line extending along a length of the elongated substrate and a cord extending along the length of the elongated substrate adjacent to the series of perforations.
Figure 3B:
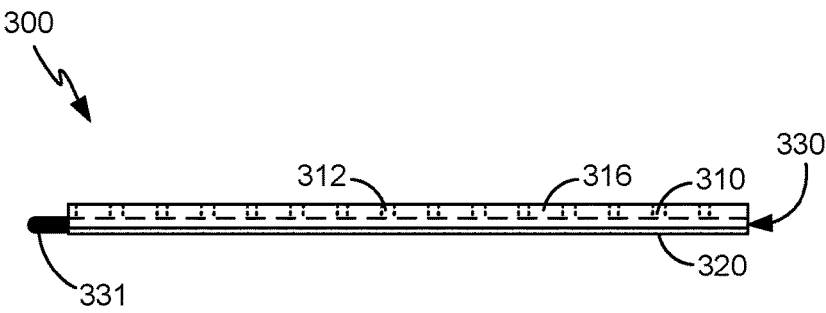
Figure 3C:
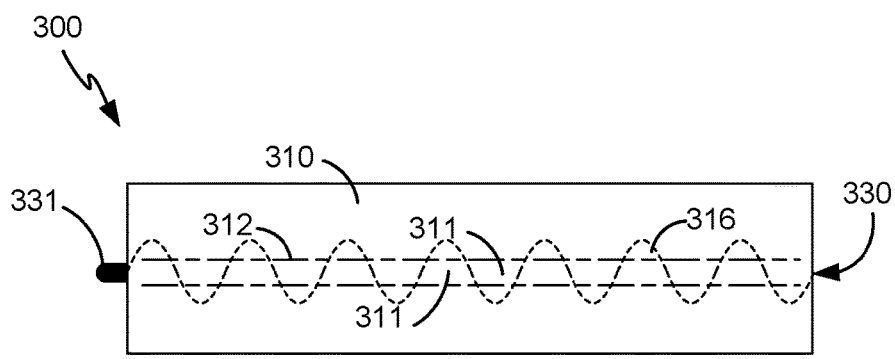
Figure 3D:
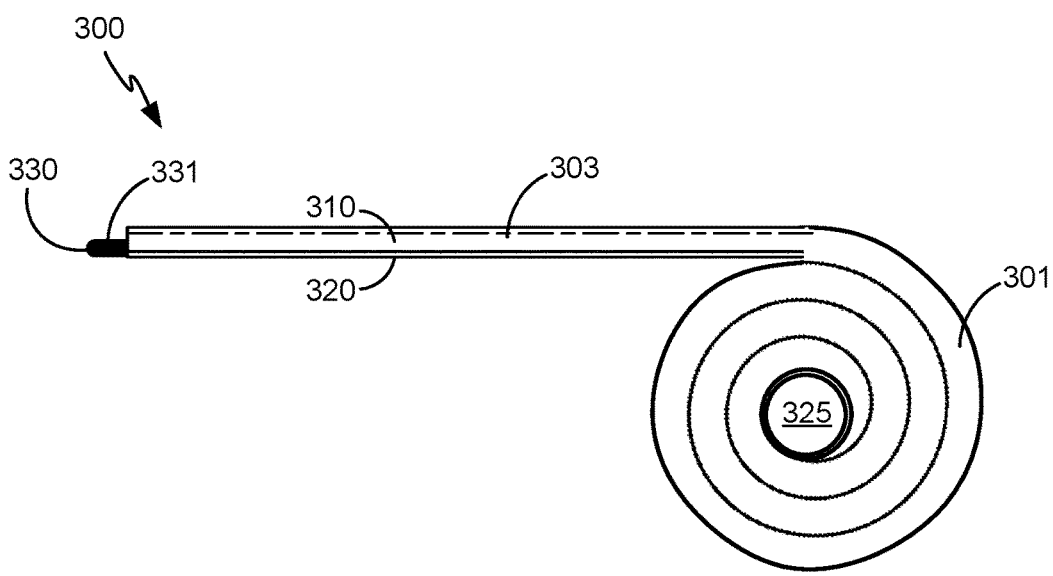

FIGS. 3A-3D illustrate an adhesive tape 300. Specifically, FIG. 3A illustrates a front view, FIG. 3B illustrates a side view, and FIG. 3C illustrates a top view of adhesive tape 300. FIG. 3D illustrates a side view of adhesive tape 300 with an end 303 extending from a wound section 301. The wound section 301 winds around a spool 325.

Adhesive tape 300 includes a generally planar elongated substrate 310 of a generally consistent width and thickness. Elongated substrate 310 includes a series of perforations 316 forming an undulating tear line extending along a length of the elongated substrate 310, an adhesive 320 substantially covering a first surface of the elongated substrate 310, and a cord 330 attached to the elongated substrate 310 by the adhesive 320, the cord 330 extending along the length of the elongated substrate 310 adjacent to the series of perforations 316.

The elongated substrate 310 may be any suitable tape substrate and may include one or more of polymer, polyethylene, polyvinyl chloride, polypropylene, polyester, paper, reinforcement strands, fiberglass reinforcement strands, and/or cloth.

The adhesive 320 may be any suitable tape adhesive, such as a pressure sensitive adhesive, and may include one or more of an acrylic adhesive, a viscoelastic polymer, an acrylate polymer, a rubber, a silicone rubber, a thermoplastic elastomer, a tackifier, a resin, an aliphatic resin, an aromatic resin, an aliphatic/aromatic resin, a hydrogenated hydrocarbon resin, terpene-phenol resin, ethylene-vinyl acetate adhesive, novolac adhesive, a rosin, and a terpene rosin.

Cord 330 is an elongated cord with a round transverse cross-section; however, in other examples, cord may have a different shape, such as a flattened transverse cross-section, a polygonal transverse cross-section, or a cross-section including edges and concave sides as shown in FIGS. 7A-7E. In various examples, cord 330 may be a nylon line, a monofilament line, a braided line, a fluorocarbon line, woven fiberglass strand, a metal wire, a natural fiber string, a paper or cardboard made from natural fibers, or other line with sufficient tensile strength to tear the elongated substrate 310 when pulled by a user. Cord 330 includes an optional exposed end 331 to facilitate pulling by the user.

In the example of tape 300, the tear line formed by the series of perforations 316 is an undulating tear line extending a length of elongated substrate 310. The undulating tear line undulates only within a central 50 percent of a width of the elongated substrate dividing elongated substrate 310 into two elongated half. The undulations create flaps 311 within the central portion of the elongated substrate 310, each flap 311 spanning a space secured by tape 300, such as the flaps 252 of box 250. In this manner, tape 300 may provide greater strength than tape 100 while maintaining the easy open advantages of tape 100.

The configuration of the series of perforations 316 is selected to provide suitable strength for securing an object with tape 300 while allowing a user to tear tape 300 along the tear line by pulling cord 330 while the adhesive tape 300 attached to an object, such as a box. For example, the perforations 316 combine to cover more than 25 percent of the length of the elongated substrate, such as at least 50 percent of the length of the elongated substrate 310, or even at least 70 percent of the length of the elongated substrate 310.

In the example of adhesive tape 300, the elongated substrate 310 includes a reduced thickness 312 adjacent to the cord 330, such as a reduced thickness is no greater than 75 percent of a thickness of the elongated substrate 310 in areas not adjacent to the cord 330. The reduced thickness 312 combines with the series of perforations 316 to facilitate tearing the elongated substrate 310 along the tear line by pulling the cord 330 while the adhesive tape 300 attached to an object, such as a box. In other examples, elongated substrate 310 may have a consistent thickness. The reduced thickness 312 may be formed as part of winding adhesive tape on spool 325, which may deform elongated substrate 310 to provide the reduced thickness without impacting the function of a pressure-sensitive adhesive used as adhesive 320.

FIGS. 4A-4D illustrate a tape dispenser 470 with spool axles 474, 476 for a roll of adhesive tape 401 and a spool of cord 431. Specifically, FIGS. 4A and 4B illustrate front and side views of tape dispenser 470 whereas FIGS. 4C and 4D illustrate front and side views of an assembly 490 including tape dispenser 470, a roll of adhesive tape 401 and a spool of cord 431.

Tape dispenser 470 includes a first spool axle 474 configured to receive a roll of adhesive tape 100, the adhesive tape 100 including an elongated substrate 110 and an adhesive 120 substantially covering a first surface of the elongated substrate 110, a cutting edge 488 configured to facilitate tearing the adhesive tape 100 after its pulled from the first spool axle 474, a second spool axle 476 configured to receive a spooled cord 130, and a loop 482 configured to orient an end of the cord 130 against a side of the elongated substrate 110 including the adhesive 120 while the end 403 of adhesive tape 100 is pulled from the spool 425 mounded on the first spool axle 474.

The tape dispenser 470 further includes a frame 472 that fixedly couples the first spool axle 474, a mount 486 for the cutting edge 488, the second spool axle 476 and the loop 482. The frame 472 is a planer element with the first spool axle 474, the cutting edge 488, the second spool axle 476 and the loop 482 extending on a post 483 from a major surface of the planar element in a common direction. As shown in FIGS. 4C and 4D, in assembly 490, the roll of adhesive tape 400 is mounted on the first spool axle 474, and the spool of cord 430 is mounted on the second spool axle 476. The loop 482 configured to orient the end of the cord 430 against a side of the elongated substrate 410 including the adhesive 420 while the end 403 of adhesive tape 100 is pulled from the spool 425 mounded on the first spool axle 474.

FIG. 5 illustrates an adhesive tape 400 formed with the tape dispenser of FIGS. 4A-4D, the adhesive tape 400 including an elongated substrate 410 and a cord 430 extending along the length of the elongated substrate 410. Cord 430 is secured to elongated substrate 410 with tape adhesive 420 as the end of tape. Elongated substrate 410, tape adhesive 420, and cord 430 are substantially similar to elongated substrate 110, tape adhesive 120, and cord 130 and their variations as described herein, including variations described with respect to adhesive tapes 100, 300, 600. For brevity these details are not repeated with respect to adhesive tape 400. For example, elongated substrate 410 may or may not include a series of perforations forming a longitudinal tear line. In addition, substrate 410 may or may not include a narrowed thickness adjacent cord 130.

Figure 6A:
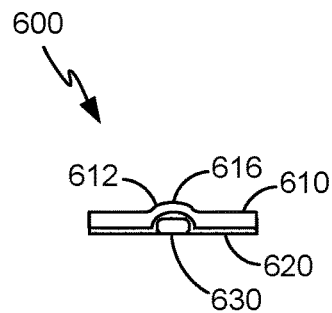
FIGS. 6A-6D illustrate an adhesive tape includes an elongated substrate with a cord extending along the length of the elongated substrate and two longitudinal series of perforations extending along a length of the elongated substrate adjacent to the cord.
Figure 6B:
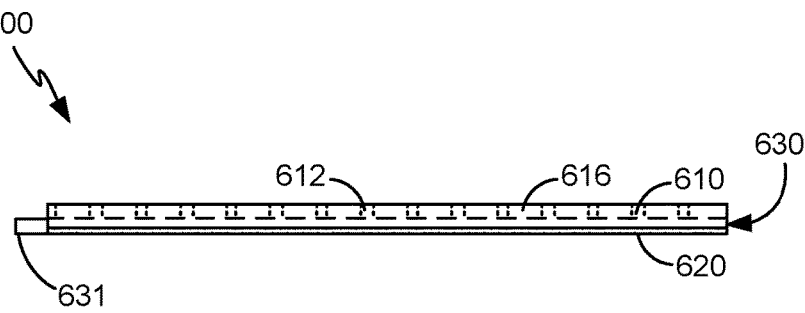
Figure 6C:
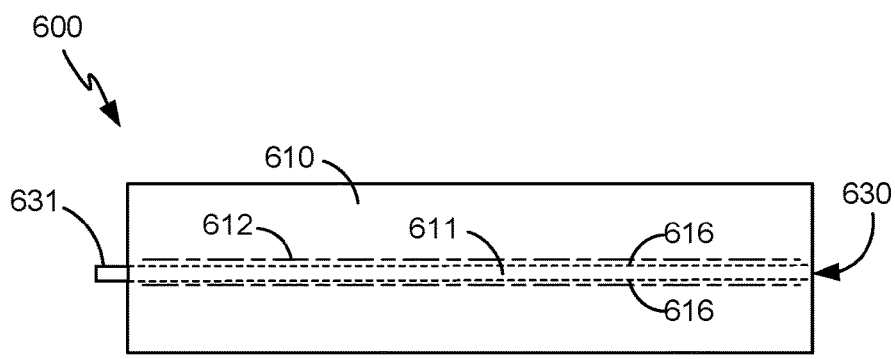
Figure 6D:
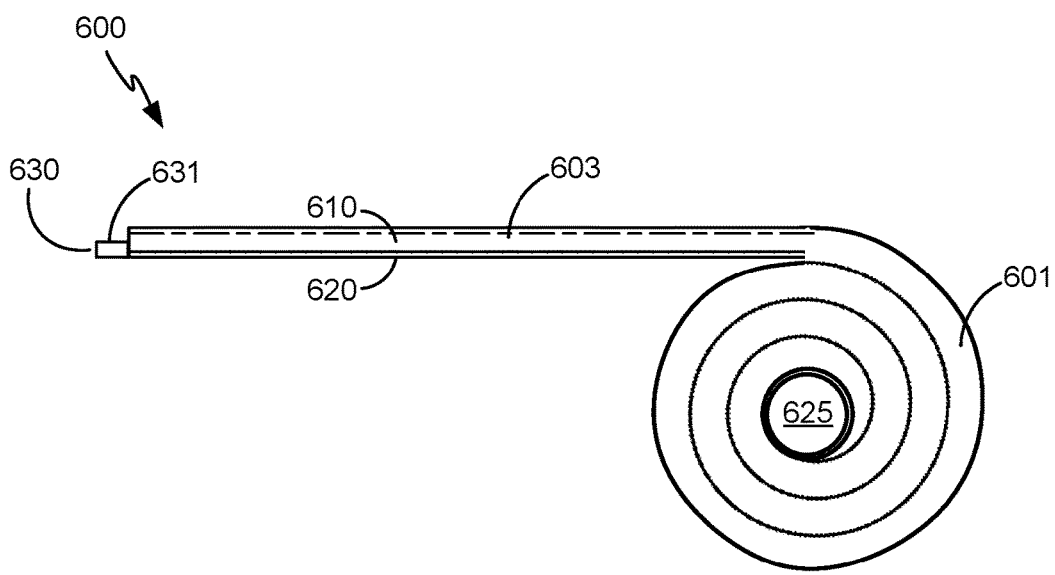

FIGS. 6A-6D illustrate an adhesive tape 600. Specifically, FIG. 6A illustrates a front view, FIG. 6B illustrates a side view, and FIG. 6C illustrates a top view of adhesive tape 600. FIG. 6D illustrates a side view of adhesive tape 600 with an end 603 extending from a wound section 601. The wound section 601 winds around a spool 625.

Adhesive tape 600 includes a generally planar elongated substrate 610 of a generally consistent width and thickness. Elongated substrate 610 includes two longitudinal series of perforations 616 forming generally parallel tear lines extending along a length of the elongated substrate 610 adjacent either side of a cord 630. As used herein, generally parallel means sufficiently parallel to provide the equivalent function as precisely parallel. Adhesive tape 600 further includes an adhesive 620 substantially covering a first surface of the elongated substrate 610, and the cord 630 attached to the elongated substrate 610 by the adhesive 620, the cord 630 extending along the length of the elongated substrate 610 adjacent to the series of perforations 616.

The elongated substrate 610 may be any suitable tape substrate and may include one or more of polymer, polyethylene, polyvinyl chloride, polypropylene, polyester, paper, reinforcement strands, fiberglass reinforcement strands, and/or cloth.

The adhesive 620 may be any suitable tape adhesive, such as a pressure sensitive adhesive, and may include one or more of an acrylic adhesive, a viscoelastic polymer, an acrylate polymer, a rubber, a silicone rubber, a thermoplastic elastomer, a tackifier, a resin, an aliphatic resin, an aromatic resin, an aliphatic/aromatic resin, a hydrogenated hydrocarbon resin, terpene-phenol resin, ethylene-vinyl acetate adhesive, novolac adhesive, a rosin, and a terpene rosin.

Cord 630 is an elongated cord with a rectangular transverse cross-section; however, in other examples, cord may have a different shape, such as a flattened transverse cross-section, a polygonal transverse cross-section, or a cross-section including edges and concave sides as shown in FIGS. 7A-7E. In various examples, cord 630 may be a nylon line, a monofilament line, a braided line, a fluorocarbon line, woven fiberglass strand, a metal wire, a natural fiber string, a paper or cardboard made from natural fibers, or other line with sufficient tensile strength to tear the elongated substrate 610 when pulled by a user. Cord 630 includes an optional exposed end 631 to facilitate pulling by the user.

In the example of tape 600, the two tear lines formed by the two parallel series of perforations 616 form a tear-away central portion 611 extending a length of elongated substrate 610 adjacent to cord 630. The configuration of the two series of perforations 616 is selected to provide suitable strength for securing an object with tape 600 while allowing a user to tear tape 600 along the tear line by pulling cord 630 while the adhesive tape 600 attached to an object, such as a box. For example, the perforations 616 combine to cover more than 25 percent of the length of the elongated substrate, such as at least 50 percent of the length of the elongated substrate 610, or even at least 70 percent of the length of the elongated substrate 610.

In the example of adhesive tape 600, the elongated substrate 610 includes a reduced thickness 612 adjacent to the cord 630, such as a reduced thickness is no greater than 75 percent of a thickness of the elongated substrate 610 in areas not adjacent to the cord 630. The reduced thickness 612 combines with the two series of perforations 616 to facilitate tearing the elongated substrate 610 along the tear lines by pulling the cord 630 while the adhesive tape 600 attached to an object, such as a box. In other examples, elongated substrate 610 may have a consistent thickness. The reduced thickness 612 may be formed as part of winding adhesive tape on spool 625, which may deform elongated substrate 610 to provide the reduced thickness without impacting the function of a pressure-sensitive adhesive used as adhesive 620.

Figure 7A:
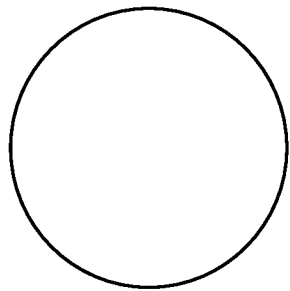
FIGS. 7A-7E illustrate example transverse cross-sections for cords suitable for use in the adhesive tapes of FIGS. 1A-1D, FIGS. 3A-3D, FIG. 5, and FIGS. 6A-6D.
Figure 7B:
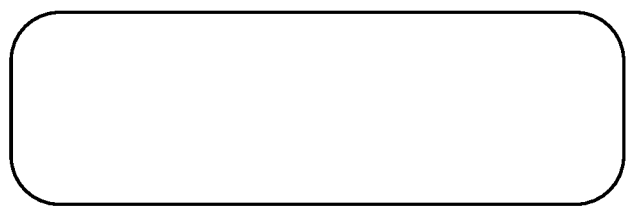
Figure 7C:
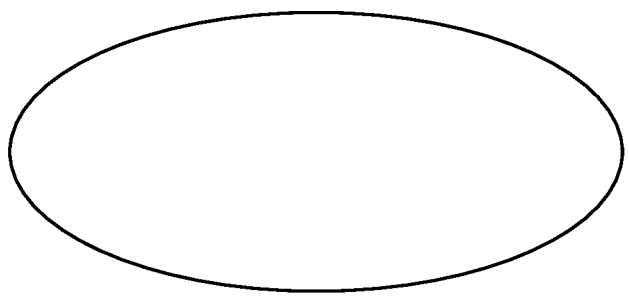
Figure 7D:
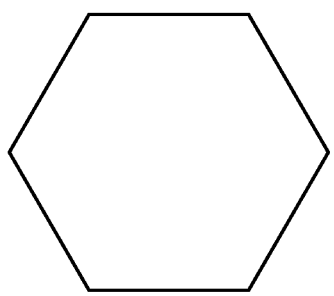
Figure 7E:
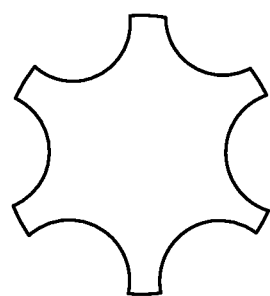

FIGS. 7A-7E illustrate example transverse cross-sections for cords suitable for use in the adhesive tapes 100, 300, 400, 600. FIG. 7A illustrates a round transverse cross-section. FIG. 7B illustrates a flattened rectangular transverse cross-section. FIG. 7C illustrates an oval transverse cross-section. FIG. 7D illustrates a polygonal transverse cross-section, including six sides, and FIG. 7E illustrates a cross-section including edges and concave sides.

The specific techniques for adhesive tape, including techniques described with respect to adhesive tapes 100, 300, 400, 600 and tape dispenser 470 are merely illustrative of the general inventive concepts included in this disclosure as defined by the following claims.

What is claimed is:

1. A tape dispenser comprising:
a first spool axle configured to receive a roll of adhesive tape, the adhesive tape including an elongated substrate and an adhesive substantially covering a first surface of the elongated substrate;
a cutting edge configured to facilitate tearing the adhesive tape after its pulled from the roll of adhesive tape on the first spool axle;
a second spool axle configured to receive a spooled cord; and
a loop configured to orient an end of the cord against a side of the elongated substrate including the adhesive while the adhesive tape is pulled from the roll of adhesive tape on the first spool axle.

2. The tape dispenser of claim 1, further comprising a frame that fixedly couples the first spool axle, the cutting edge, the second spool axle and the loop.

3. The tape dispenser of claim 2, wherein the frame is a planar element with the first spool axle, the cutting edge, the second spool axle and the loop extending from a major surface of the planar element in a common direction.

4. An assembly comprising:
a roll of adhesive tape, the adhesive tape including an elongated substrate and an adhesive substantially covering a first surface of the elongated substrate;
a spool of cord; and
a tape dispenser, the tape dispenser comprising:
a first spool axle with the roll of adhesive tape mounted thereon;
a cutting edge configured to facilitate tearing the adhesive tape after its pulled from the first spool axle;
a second spool axle with the spool of cord mounted thereon; and
a loop configured to orient an end of the cord against a side of the elongated substrate including the adhesive while the adhesive tape is pulled from the roll of adhesive tape on the first spool axle.

5. The assembly of claim 4,
wherein the elongated substrate includes a reduced thickness adjacent to the cord, and
wherein the reduced thickness is no greater than 75 percent of a thickness of the elongated substrate in areas not adjacent to the cord.

6. The assembly of claim 4, wherein the cord is selected from a group consisting of:
a nylon line;
a monofilament line;
a braided line;
a fluorocarbon line;
a woven fiberglass strand;
a metal wire;
paper;
cardboard; and
a natural fiber string.

7. The assembly of claim 4, wherein the elongated substrate includes a series of perforations forming a tear line extending along a length of the elongated substrate.

8. The assembly of claim 7, wherein the tear line formed by the series of perforations is a longitudinal tear line.

9. The assembly of claim 7, wherein the perforations in the series of perforations combine to cover more than 50 percent of the length of the elongated substrate.

10. The assembly of claim 7, wherein the tear line formed by the series of perforations is an undulating tear line.

11. The assembly of claim 10, wherein the undulating tear line undulates only within a central 50 percent of a width of the elongated substrate.

12. The assembly of claim 7,
wherein the series of perforations is one of two series of perforations adjacent either side of the cord, and
wherein the two series of perforations form a tear-away central portion of the substrate extending the length of the elongated substrate adjacent to the cord.

13. The assembly of claim 4, wherein the elongated substrate includes one or more of a group consisting of:
polymer,
polyethylene;
polyvinyl chloride;
polypropylene;
polyester;
paper,
reinforcement strands;
fiberglass reinforcement strands; and
cloth.

14. The assembly of claim 4, wherein the adhesive includes one or more of a group consisting of:
a pressure sensitive adhesive;
an acrylic adhesive;
a viscoelastic polymer;
an acrylate polymer;
a rubber;
a silicone rubber;
a thermoplastic elastomer;
a tackifier;
a resin;
an aliphatic resin;
an aromatic resin;
an aliphatic/aromatic resin;
a hydrogenated hydrocarbon resin;
terpene-phenol resin;
ethylene-vinyl acetate adhesive;
novolac adhesive;
a rosin; and
a terpene rosin.

15. The assembly of claim 4,
wherein an end of the adhesive tape extends from the roll of adhesive tape towards the cutting edge,
wherein the cord extends from the spool of cord, through the loop, and
wherein an end segment of the cord extending beyond the loop is attached to the elongated substrate by the adhesive.

16. The assembly of claim 4, wherein the tape dispenser further comprises a frame that fixedly couples the first spool axle, the cutting edge, the second spool axle and the loop.

17. The assembly of claim 16, wherein the frame is a planar element with the first spool axle, the cutting edge, the second spool axle and the loop extending from a major surface of the planar element in a common direction.

18. The assembly of claim 4, wherein the cord includes a transverse cross-section selected from a group of:
a round cross-section;
a flattened transverse cross-section;
a polygonal transverse cross-section; and
a cross-section including edges and concave sides.

19. A tape dispenser comprising:
a first spool axle configured to receive a roll of adhesive tape, the adhesive tape including an elongated substrate and an adhesive substantially covering a first surface of the elongated substrate;
a cutting edge configured to facilitate tearing the adhesive tape after its pulled from the roll of adhesive tape on the first spool axle;
a second spool axle configured to receive a spooled cord;
a cord guide configured to orient an end of the cord against the first surface of the elongated substrate while the adhesive tape is pulled from the roll of adhesive tape on the first spool axle; and
a frame that fixedly couples the first spool axle, the cutting edge, the second spool axle and the cord guide,
wherein the first spool axle, the cutting edge, the second spool axle and the cord guide extend from the frame in a common direction,
wherein the first spool axle is offset from the second spool axle in a direction transverse to the common direction.

20. The tape dispenser of claim 19, wherein the frame includes a planar element with the first spool axle, the cutting edge, the second spool axle and the cord guide extending from a major surface of the planar element in the common direction.

21. The tape dispenser of claim 19, wherein the cord guide includes a loop configured to orient the end of the cord against the first surface of the elongated while the adhesive tape is pulled from the roll of adhesive tape on the first spool axle.

22. An assembly comprising:
the tape dispenser of claim 19;
the roll of adhesive tape mounted on the first spool axle; and
the spooled cord mounted on the second spool axle and extending through the cord guide with an end segment of the cord extending beyond the cord guide attached to the first surface of the elongated substrate by the adhesive.

* * * * *